United States Patent [19]

Yamakawa et al.

[11] Patent Number: 5,356,842
[45] Date of Patent: Oct. 18, 1994

[54] COMPOSITE CERAMIC POWDER AND PRODUCTION PROCESS THEREOF

[75] Inventors: Akira Yamakawa; Koichi Sogabe, both of Itami, Japan

[73] Assignee: Sumitomo Electric Industries, Ltd., Japan

[21] Appl. No.: 33,960

[22] Filed: Mar. 19, 1993

Related U.S. Application Data

[63] Continuation of Ser. No. 813,893, Dec. 23, 1991, abandoned.

[30] Foreign Application Priority Data

Dec. 26, 1990 [JP] Japan ................... 2-406913
Jan. 21, 1991 [JP] Japan ................... 3-019234
Feb. 12, 1991 [JP] Japan ................... 2-038887

[51] Int. Cl.$^5$ .................. C04B 35/52; C04B 35/58; C04B 35/02
[52] U.S. Cl. .................. 501/87; 501/88; 501/89; 501/96; 501/97; 501/103; 501/108; 501/118; 501/127; 501/133; 501/135
[58] Field of Search .................. 501/80, 84, 85, 88, 501/92, 95, 96, 98, 97, 87, 89, 103, 108, 118, 127, 133, 135, 154; C04B 35/52, 35/58, 35/02

[56] References Cited

U.S. PATENT DOCUMENTS

| | | | |
|---|---|---|---|
| 4,362,651 | 12/1982 | Schwarzenbek | 501/80 |
| 4,652,413 | 1/1989 | Tiegs | 501/95 |
| 4,735,922 | 4/1988 | Ray | 501/80 |
| 4,764,489 | 8/1988 | Bolt | 501/96 |
| 4,800,182 | 1/1989 | Izaki et al. | 501/95 |
| 4,804,645 | 2/1989 | Elkstrom | 501/96 |
| 4,808,558 | 2/1989 | Park et al. | 501/92 |
| 4,871,694 | 10/1989 | Legare | 501/85 |
| 4,997,798 | 3/1991 | Okuno et al. | 501/96 |

FOREIGN PATENT DOCUMENTS

| | | | |
|---|---|---|---|
| 0126847 | 12/1984 | European Pat. Off. | 501/80 |
| 212344 | 3/1987 | European Pat. Off. | C04B 35/58 |
| 472776 | 3/1992 | European Pat. Off. | C04B 35/58 |
| 0030770 | 2/1984 | Japan | 501/92 |
| 0154992 | 9/1985 | Japan | 501/96 |
| 0195060 | 10/1985 | Japan | 501/96 |
| 2149771 | 6/1985 | United Kingdom | 501/80 |

OTHER PUBLICATIONS

Patent Abstracts of Japan, vol. 11, No. 267 (C-443); Aug. 28, 1987 JPA-62-70,210; Mar. 31, 1987.
Patent Abstracts of Japan, vol. 12, No. 426 (C-542); Nov. 10, 1988 JPA-63-156,007; Jun. 29, 1988.
Patent Abstracts of Japan, vol. 14, No. 188 (C-70); Apr. 17, 1990 JPA-2-34, 566; Feb. 5, 1990.
Database WPIL, Week 9148; Derwent Publ. AN-91-349,086 JPA-3-232,707; Oct. 16, 1991.

*Primary Examiner*—Karl Group
*Assistant Examiner*—Paul Marcantoni
*Attorney, Agent, or Firm*—Jordan B. Bierman

[57] ABSTRACT

This invention provides composite ceramic powder comprising matrix ceramic powder and fine particles of ceramic, metal or metal compound which are different from the matrix ceramic powder and dispersed in the matrix ceramic powder. The composite ceramic powder is produced by mixing matrix ceramic powder or its precursor with fine particles to be dispersed therein and then heating the resulting mixture. The composite ceramic powder is also produced by dispersing matrix ceramic particles or precursor thereof in an organic solvent with an organic compound as a dispersoid particle precursor and separating and recovering the organic solvent. The composite ceramic powder is suitable for producing sintered bodies having excellent properties, especially with respect to thermal conductivity, flexural strength and light transmittance, by a conventional ceramic fabrication process.

22 Claims, No Drawings

COMPOSITE CERAMIC POWDER AND PRODUCTION PROCESS THEREOF

This application is a continuation of patent application Ser. No. 07/813,893, filed Dec. 23, 1991, now abandoned.

BACKGROUND OF THE INVENTION

1. Field of the Invention

This invention relates to composite ceramic powder with fine ceramic, metal or metal compound particles, which are different from the matrix, dispersed in the powder and also to a production process thereof.

2. Description of the Prior Art

A wide variety of research is now under way with a view toward fully making use of the inherent excellent properties (high heat resistance, high strength, high abrasion resistance, high corrosion resistance, etc.) of ceramic materials, especially for use in structural materials and electromagnetic materials. Further, high purification, compositional or structural control or combinations with other materials into composite materials, have also been studies to provide high-performance materials. For example, micro composite materials (combinations with whiskers, long fibers or the like), nano composite materials (combinations with particles of the nanometer order), etc. are known as reported in New Ceramics, No. 5, p. 65-70. (1989). For example, high purification of ceramic powder provides a sintered AlN body having improved purity and hence high heat resistance [for example, see Japanese Patent application Laid-Open (Kokai) No. 61-201668]. In connection with sintered $Si_3N_4$ bodies, fiber-reinforced, sintered bodies and transgranular-dispersion-type sintered bodies have been studied. These studies are said to have led to substantial improvements in strength [see New Ceramics, No. 5, 65-70 (1989)]. It is also known that use of a transition metal compound in a sintered AlN body provides a sintered body having opacity and high thermal conductivity [see Japanese Patent Application Laid-Open (Kokai) No. 2-124772).

Conventional processes for the formation of composite materials on the nanometer order includes the sintering process in which ceramic powder and fine dispersoid particles are mixed and then sintered, the CVD process (chemical vapor deposition process), and the precursor process in which a precursor is synthesized and then sintered. These conventional processes are, however, accompanied by one or more problems. Namely, the sintering process involves the problem of non-uniformity caused upon grain growth or the like in the course of sintering. The CVD process involves the problem of low productivity. The precursor process involves difficulties in handling a precursor or a limitation imposed on the available combinations of matrix materials and dispersoid materials.

SUMMARY OF THE INVENTION

An object of this invention is to overcome the problems described above. The present invention therefore provides composite ceramic powder comprising matrix ceramic powder and fine particles dispersed in the matrix ceramic powder. This invention also provides a process for the production of composite ceramic powder, which comprises mixing matrix ceramic powder or a ceramic precursor, which changes to matrix ceramic powder when heated, with dispersoid particles or a dispersoid particle precursor which changes to fine dispersoid particles when heated; and then heating the resulting mixture.

The present invention further a process for the production of composite ceramic powder, which comprises dispersing matrix ceramic particles or precursor thereof in an organic solvent with an organic compound as a dispersoid particle precursor and separating and recovering the organic solvent.

DETAILED DESCRIPTION OF THE PREFERRED EMBODIMENTS

Although no particular limitation is imposed on the kind of matrix ceramic powder in the present invention, a great industrial value can be brought about especially when the matrix ceramic powder is made of one or more of the nitrides, carbides and oxides of Si, Al, Zr, Ti, Mg and B such as $Si_3N_4$, SiC, $SiO_2$, AlN, $Al_2O_3$, $ZrO_2$, $TiO_2$, MgO, BN, $B_4C$, etc. Likewise, no particular limitation is imposed on the fine ceramic, metal or metal compound particles as dispersoid particles. Preferred are, however, fine particles different in composition from the matrix powder, for example, fine particles of at least one element, compound or ceramic of Ti, Zr, Hf, V, Nb, Ta, Mo, W, Fe, Co, Ni, Cu, Ag, Au, Pt, Pd, B, Mg, Al, Si, etc. There may be mentioned a non-oxide compound such as $Si_3N_4$, SiC, TiC or TiN, an oxide such as $Al_2O_3$ or $BaTiO_3$, or a high melting-point metal typified by a transition metal such as W, Mo, Ti, V, Fe or Mn.

In this invention, it is preferable that ceramic powder to be formed into a matrix has an average particle size not greater than 5 $\mu$m and the dispersed particles are contained as particles not greater than 2 $\mu$m, preferably not greater than 1 $\mu$m, most preferably not greater than 100 nm, in diameter among the matrix-forming particles. Coarse particles result in difficult sintering, whereby properties of the matrix material cannot be exhibited. The finer the dispersed particles, the more preferable. Coarse particles cannot be contained in the matrix grains. The dispersed particles may preferably be crystal particles not greater than one fifth of the matrix grains. The dispersed particles are not limited to only one kind of particles but may contain two or more kinds of different particles. The content of these dispersed particles should be 0.01-50 wt. %, calculated as elements, of the resulting powder, because any amounts smaller than 0.01 wt. % cannot bring about appreciable effects while any amounts in excess of 50 wt. % make it impossible to retain the properties of the matrix material. Throughout the specification and claims, the contents of the dispersed particles are indicated by weight percentages calculated as elements based on the weight of the composite ceramic powder, unless otherwise specified. It is preferable that no solid solution is formed between the matrix composition and the dispersed particles. Especially, the inclusion of dispersed particles as solid solution in the matrix particles should be limited to 1 wt. % or less. In such a compositional control, it is possible to obtain a sintered ceramic powder having a cellular structure including dispersoid particles having a crystal structure different from that of the matrix ceramic crystals. Solid solution elements to the matrix compound, said elements being particularly troublesome as impurities, must be controlled strictly. In the case of AlN, for example, it is necessary to reduce O, C and the like as much as possible to 2 wt. % or less, preferably to 1 wt. % or less.

To obtain the composite ceramic powder of this invention, matrix ceramic powder or a precursor which changes to matrix ceramic powder when heated is intimately mixed with dispersoid particles or a precursor which also changes to dispersoid particles when heated. The resultant mixture is then heated so that composite powder with the dispersoid particles distributed in the matrix ceramic particles can be synthesized. For example, there may be obtained a sintered composite ceramic powder having a cellular structure such that, in the ceramic crystals, fine function particles having a crystal structure different from that of the ceramic crystals are dispersed. For example, in the production of the composite ceramic powder of the present invention, amorphous Si—N—O—C compounds can be mentioned as illustrative usable $Si_3N_4$ precursors. Examples of AlN precursors include amorphous Al—N—O—C compounds. As precursors for dispersoid Ti compound particles, titanium alkoxides, titanium stearate and the like can be used. These precursors are thoroughly mixed, for example, in a ball mill or by ultrasonic waves and then heated, for example, at 1,300°–1,700° C. in nitrogen, whereby AlN—TiN or $Si_3N_4$—TiN composite powder can be obtained. Combinations of AlN or $Si_3N_4$ with TiN have been described above. It is however, to be noted that other combinations are feasible, so that the above description shall not be construed in limiting sense.

In another process according to this invention for the production of ceramic composite powder, matrix ceramic particles or their precursor are dispersed in an organic solvent with an organic compound, which change to fine dispersoid compound particles in the ceramic composite powder, dissolved therein. By separating and recovering the organic solvent, ceramic composite powder with the fine compound particles contained in the matrix ceramic particles can be obtained. As the organic compounds, there may be used organic compounds of at least one element selected from among Ti, Zr, Hf, V, Nb, Ta, Mo, W, Fe, Co, Ni, Cu, Ag, Au, Pt, Pd, B, Mg, Al, Si, etc.

For example, aluminum nitride powder useful in the practice of this invention can be obtained by a suitable method such as nitriding of metal aluminum, reductive nitriding of alumina ($Al_2O_3$) or heating of the aluminate salt of a guanidine compound. Synthesis is then conducted such that particles of a metal compound as mentioned above are contained in the individual particles of the aluminum nitride powder.

Although no particular limitation is imposed on the manner of synthesis of aluminum nitride, aluminum nitride having a higher nitriding reactivity (the number of N atoms bonded per Al atom) is generally employed since a higher nitriding reactivity can provide a sintered aluminum nitride body having higher thermal conductivity. It is preferable to use aluminum nitride in which the percentage of N atoms bonded to Al atoms is 95% or higher. As aluminum nitride particles, those having a fine particle size are preferred, with those having an average particle size not greater than 2 $\mu$m being particularly preferred. Notably, aluminum nitride particles having an average particle size not greater than 1 $\mu$m are preferred. Incidentally, these particle sizes of aluminum nitride are values measured by the centrifugal sedimentation method.

The less than impurities in aluminum nitride, the more preferred. As long as transition metal elements added as the dispersoid are concerned, their inclusion up to about 1 wt. %, however, does not deteriorate the properties of aluminum nitride at all unless they are in a state incorporated as solid solution in lattices of aluminum nitride. By adding a compound of a transition metal to aluminum metal, alumina ($Al_2O_3$), a guanidine compound or the like as a raw material precursor, aluminum nitride particles containing particles of the compound of the transition metal can be synthesized. Here, it is necessary to optimize the conditions for the synthesis of aluminum nitride powder by reducing the amounts of elements other than the transition metal, especially the amounts of elements (oxygen, carbon, etc.) which may be incorporated as solid solution in lattices of aluminum nitride. In the synthesis of aluminum nitride powder, the content of the above transition element can preferably be 0.01–30 wt. %. As the state of existence of the compound of the element, the compound of the element can be distributed as particles on the surfaces of aluminum nitride particles. Any contents of the above transition element smaller than 0.01 wt. % are too small to give sufficient contribution to the opacity of a sintered aluminum nitride body to be obtained using the aluminum nitride powder so synthesized. In the composite aluminum nitride powder, when the content of the transition element exceeds 30 wt. %, the aluminum nitride powder so synthesized can provide only sintered aluminum nitride bodies having lowered thermal conductivity.

As a process for synthesizing the composite aluminum nitride powder, if the element to be added to aluminum nitride particles is, for example, titanium (Ti), the following process can be adopted. Namely, an organotitanate (tetraisopropoxy titanium or the like) is dissolved in an organic solvent such as ethanol, benzene, toluene or the like, followed by hydrolysis. Aluminum nitride particles as the raw material is then dispersed in the resultant solution, whereby particles of a compound of titanium are caused to deposit on the surfaces of the aluminum nitride particles. As an alternative process, the aluminum nitride particles distributed in the organic solvent is dried by spray drying or the like, whereby the surfaces of the aluminum nitride particles are coated with particles of the compound of the element. According to these processes, the particles of the compound of the above element can be dispersed extremely uniformly in aluminum nitride particles or the surfaces of aluminum nitride particles can be uniformly coated with particles of the compound of the element. Even if the content of the element is 0.01 wt. % or so, the particles of the compound of the element can be uniformly dispersed in aluminum nitride particles or can uniformly coat the surfaces of aluminum nitride particles.

The above process can be also used for the production of other composite ceramic powder of the present invention.

The composite powder obtained as described above is then formed and sintered in a manner known per se in the art, whereby it is densified into a sintered body of the composite material. The sintered body so obtained has significantly high mechanical strength and toughness compared to conventional non-blended sintered bodies. Even when conductive particles are combined with insulating ceramics, the insulating property of the insulating ceramics can be retained over a wide proportion range of the conductive particles. It is hence still possible to obtain high-strength ceramics while retaining insulating property.

The present invention will hereinafter be described by the following examples. In examples, percentages given refer to percentage by weight, unless otherwise indicated.

EXAMPLE 1

SiCl$_4$ was heated at 900° C. in nitrogen, so that Si$_3$N$_4$ powder having a BET surface area of 100 m$^2$/g, measured by a BET method, was obtained. The powder so obtained contained 3% of oxygen. The Si$_3$N$_4$ powder was added with 50% of titanium stearate, based on the weight of Si$_3$N$_4$, followed by through mixing in hexane. The resultant mixture was dried and then heated at 1,500° C. for 1 hour under nitrogen gas stream. As a result, powder having an average particle size of 0.6 μm and containing TiN particles of 50 nm in average particle size distributed in the powder was obtained. The content of Ti was 0.7%. Further, the oxygen content was 0.8% and the total content of cationic impurities other than Ti did not exceed 100 ppm. The powder so obtained was added with a forming binder and 1.0 wt. % of Y$_2$O$_3$ as a sintering aid, formed into 60×60×0.7 mm sheets, and then sintered at 1,800° C. for 2 hours under N$_2$ gas stream. The thermal conductivity, transverse rupture strength and fracture toughness (KIC) of the sintered bodies were 80 W/m·K, 120 kg/mm$^2$ and 8 MN/m$^{3/2}$, respectively.

EXAMPLE 2

AlCl$_3$ was heated at 850° C. under nitrogen gas stream, whereby AlN powder having a BET surface area of 150 m$^2$/g was obtained. The powder so obtained contained 5% of oxygen. The AlN powder was added with 50% of titanium stearate, based on the weight of AlN, and, in a glove box, was thoroughly mixed using hexane as a solvent. The resultant mixture was dried and then heated at 1,500° C. for 1 hour under nitrogen gas stream, whereby powder having an average particle size of 0.5 μm and containing TiN particles of 80 nm in average particle size distributed in the powder was obtained. The content of Ti was 3.5%. Further, the oxygen content was 0.7% and the total content of cationic impurities other than Ti did not exceed 100 ppm. The powder so obtained was added with a forming binder and 1.0 wt. % of Y$_2$O$_3$, based on the weight of the powder, as a sintering aid, formed into 60×60×0.7 mm sheets, and then sintered at 1,800° C. for 2 hours under N$_2$ gas stream. The thermal conductivity, transverse rupture strength and fracture toughness (KIC) of the sintered bodies were 190 W/m·K, 100 kg/mm$^2$ and 6 MN/m$^{3/2}$, respectively. Compared to conventional sintered AlN bodies, the transverse rupture strength was extremely high. Further, transmission of visible light was not observed.

EXAMPLE 3

BCl$_4$ was heated together with CH$_4$ at 900° C., so that fine B$_4$C particles having a BET surface area of 80 m$^2$/g were obtained. The B$_4$C powder thus obtained was added with 50% of titanium stearate, based on the weight of B$_4$C, and was then thoroughly mixed in hexane. After the resultant mixture was dried, it was heated at 1,500° C. for 1 hour under nitrogen gas stream, whereby powder having an average particle size of 0.6 μm and containing TiN particles of 50 nm in average particle size distributed in the powder was obtained. The content of Ti was 0.7%. Further, the oxygen content was 0.8% and the total content of cationic impurities other than Ti did not exceed 100 ppm. The powder so obtained was hot-pressed into a sintered body of 40×40×5 mm at 2,000° C. for 1 hour under the pressure of 200 kg/cm$^2$ in Ar gas. The sintered body was dense and its transverse rupture strength was 100 kg/mm$^2$.

EXAMPLE 4

Si$_3$N$_4$ powder having a dispersoid phase therein was synthesized by the carbon reduction of SiO$_2$ powder in which each compound as shown in Table 1 was previously added to the SiO$_2$ powder. The SiO$_2$ powder was fine powder whose average particle size was 0.01 μm. The synthesis temperature and time were 1,650° C. and 1 hour. The synthesis was conducted under N$_2$ gas stream. The resulting powder was Si$_3$N$_4$ powder, which had an average particle size of 1.0 μm and contained the compound(s), which are shown in Table 1, as fine particles not greater than 0.2 μm in the Si$_3$N$_4$ particles. Y$_2$O$_3$ was added in an amount of 1.0 wt. %, based on the weight of the Si$_3$N$_4$ powder, to the Si$_3$N$_4$ powder, followed by hot-pressing at 1,750° C. for 2 hours under the pressure of 200 kg/cm$^2$ in N$_2$. Properties of the sintered bodies so obtained are shown in Table 2.

TABLE 1

| No. | Compound added | Amount of metallic element in powder (wt. %) | |
|---|---|---|---|
| 1 | SiC | SiC | 0.1 |
| 2 | SiC | SiC | 2.0 |
| 3 | SiC | SiC | 15.0 |
| 4 | SiC | SiC | 40.0 |
| 5* | SiC | SiC | 60.0 |
| 6 | TiO$_2$ | TiO$_2$ | 1.0 |
|   | SiC | SiC | 3.0 |
| 7 | TiO$_2$ | TiO$_2$ | 1.0 |
|   | W | W | 2.0 |
| 8 | TiC | TiC | 2.0 |
|   | AlN | AlN | 5.0 |
| 9 | B$_4$C | B$_4$C | 1.0 |
|   | BN | BN | 2.0 |
| 10* | Not added | — | |

(Note)
*Comparative Example

TABLE 2

| No. | Flexural strength (GPa) | Fracture toughness (MN/m$^{3/2}$) | Hardness (Hv) |
|---|---|---|---|
| 1 | 1.0 | 5.0 | 1700 |
| 2 | 1.2 | 7.0 | 2000 |
| 3 | 1.5 | 9.0 | 2400 |
| 4 | 1.2 | 9.5 | 2200 |
| 5* | 0.8 | 8.0 | 1600 |
| 6 | 1.5 | 9.0 | 2400 |
| 7 | 1.3 | 7.0 | 1900 |
| 8 | 1.5 | 9.0 | 1800 |
| 9 | 1.3 | 7.5 | 2000 |
| 10* | 0.8 | 4.5 | 1600 |

(Note)
*Comparative Example

EXAMPLE 5

AlN powder having a dispersoid phase therein was synthesized by the carbon reduction of Al$_2$O$_3$ powder in which each compound as shown in Table 3 was previously added to the Al$_2$O$_3$ powder. The Al$_2$O$_3$ powder was powder whose average particle size was 0.4 μm. The synthesis conditions were 1,650° C.×1 hour. The synthesis was conducted under N$_2$ gas stream. The resulting powder was AlN powder, which had an average particle size of 0.7 μm and contained the compound(s), which are shown in Table 3, as particles not greater than 0.2 μm in the AlN particles. AlN powder was found to contain the impurity(ies) shown in Table 3. $Y_2O_3$ was added in an amount of 0.5 wt. %, based on the weight of the AlN powder, to the AlN powder, followed by hot-pressing at 1,900° C. for 1 hour under $N_2$ gas stream. Properties of the sintered AlN bodies so obtained are shown in Table 4.

TABLE 3

| | | Composition of AlN powder (wt. %) | | |
|---|---|---|---|---|
| No. | Additive | Amount of metallic element | O Content | Cationic impurity |
| 11 | $TiO_2$ | $TiO_2$ 1.0 | 0.8 | <0.1 |
| 12 | $TiO_2$ | $TiO_2$ 1.0 | 1.5 | <0.1 |
| 13* | $TiO_2$ | $TiO_2$ 1.0 | 3.0 | <0.1 |
| 14 | $TiO_2$ W | $TiO_2$ 1.0 W 1.0 | 0.8 | <0.1 |
| 15* | W | W 1.0 | 0.8 | Si 1.5 |
| 16* | W | W 1.0 | 0.8 | Fe 0.2 Si 1.0 |
| 17 | $TiO_2$ | $TiO_2$ 0.01 | 0.8 | <0.1 |
| 18 | $B_2O_3$ $TiO_2$ | $TiB_2$ 0.1 BN 1.0 | 1.2 | <0.1 |
| 19 | $V_2O_3$ $B_2O_3$ | VN 1.0 BN 1.0 | 0.8 | <0.1 |
| 20 | Ti B | TiB 2.0 | 0.8 | <0.1 |

(Note)
*Comparative Example

TABLE 4

| No. | Thermal conductivity (W/m · K) | Flexural strength (kg/mm²) | Light transmittance (%) 0.3 mmT, Wavelength: 5 μm |
|---|---|---|---|
| 11 | 180 | 60 | <1.0 |
| 12 | 150 | 60 | <1.0 |
| 13* | 80 | 60 | <1.0 |
| 14 | 180 | 70 | <1.0 |
| 15* | 40 | 70 | <1.0 |
| 16* | 40 | 70 | <1.0 |
| 17 | 180 | 35 | 40 |
| 18 | 180 | 65 | <1.0 |
| 19 | 180 | 65 | <1.0 |
| 20 | 180 | 65 | <1.0 |

(Note)
*Comparative Example

EXAMPLE 6

Aluminum nitride particles were prepared using the direct nitriding method. The aluminum nitride particles had 0.8 μm average particle size, 1.5 wt. % oxygen content, 0.02 wt. % carbon content and 0.008 wt. % silicon content and the total content of other impurities was 0.005 wt. % or less. As a raw material, the aluminum nitride particles were thoroughly dispersed in ethanol in which a transition metal alkoxide had been dissolved. The aluminum nitride particles were then dried by a spray dryer, whereby aluminum nitride powder containing particles of the transition metal compound was obtained. In the production of the aluminum nitride particles, Ti, Zr, Hf, V, Nb, Ta, Co, Ni and Cu were each used as transition metals, and the content of each element ranged from 0.2 to 1.0 wt. %.

With each of the aluminum nitride powder samples synthesized as described above, 1.0 wt. % of $Y_2O_5$ powder and 10 wt. % of PVB, both based on the weight of the aluminum nitride powder, were mixed in toluene as a solvent. The resultant mass was formed into a sheet-like configuration and then punched into green sheets of 50 mm×50 mm squares. Those green sheets were sintered at 1,800° C. for 5 hours in a nitrogen atmosphere, whereby sintered aluminum nitride bodies were obtained.

The absorption coefficient, thermal conductivity and flexural strength of each sintered aluminum nitride body were measured. In the sintered aluminum nitride body containing any one of the transition metal compounds, the absorption coefficient, thermal conductivity, flexural strength and fracture toughness (KIC) were at least 60 cm$^{-1}$ (wavelength: 5 μm), at least 100 W/m·K, at least 40 kg/mm² and at least 3.5 MN/m$^{3/2}$, respectively.

EXAMPLE 7

Alumina ($Al_2O_3$) was treated by the reductive nitriding method to provide aluminum nitride particles as raw material powder. The aluminum nitride particles had 1.0 μm average particle size, 1.2 wt. % oxygen content, 0.03 wt. % carbon content, 0.005 wt. % silicon content and 0.3 wt. % titanium content, and the total content of other impurities was 0.005 wt. % or less. The aluminum nitride particles were dispersed in isopropanol as a solvent in which a transition metal alkoxide had been dissolved. The pH of the solution was then adjusted to 4–8 at 50° C. By adding water dropwise into the solution, hydrolysis was conducted. As a result, particles of the oxide of the transition metal was successfully distributed on the surfaces of the aluminum nitride particles. As the transition metal element, Ti, Zr, V and Cr were each used. The content of each transition metal oxide in the aluminum nitride powder ranged from 1.0 to 3.0 wt. %. After the organic solvent was recovered by filtration, the powder was dried.

Each synthetic aluminum nitride powder sample so obtained was mixed with 1.0 wt. % of $Y_2O_3$ powder, based on the weight of the aluminum nitride powder, to which camphor was added as a forming aid. The resulting mixture was then press-formed under the pressure of 1 ton/cm². The green compact so obtained was sintered for 2 hours in a nitrogen gas stream of 1,850° C. With respect to each of sintered aluminum nitride bodies, the thermal conductivity, flexural strength and absorption coefficient were measured. In each sintered aluminum nitride body, the thermal conductivity, flexural strength and absorption coefficient (to light of 5 μm wavelength) were at least 130 W/m·K, at least 45 kg/mm² and at least 60 cm$^{-1}$ respectively. It was also found that each transition metal element was dispersed as nitride particles in the aluminum nitride particles.

EXAMPLE 8

Aluminum nitride powders having different specific surface areas of 10 m²/g, 20 m²/g, 50 m²/g and 100 m²/g were produced by the reaction of alkyl aluminum in a mixed gas of $NH_3$ and $N_2$. 94.5 part by weight of each aluminum nitride powder so obtained was mixed with 4.5 parts by weight of $Si_3N_4$ synthesized by the imide decomposition method and having a specific surface area of 12 m²/g and 1 part by weight of acetylene black in ethyl alcohol under ultrasonic irradiation, dried and heated at 1500° C. under nitrogen gas stream, whereby aluminum nitride powder containing $Si_3N_4$ particles of 300 nm in average particle size distributed in the powder was obtained.

$Y_2O_3$ and CaO were added in amounts of 1.5 wt. % and 0.4 wt. %, respectively, based on the weight of the composite nitride powder, to the Si₃N₄-AlN composite powder so obtained and sintered at 1800° C. for 5 hours in N₂ gas stream. The flexural strength (three-point bending strength) and thermal conductivity of the resultant sintered bodies are shown in Table 5.

TABLE 5

| Specific surface area | Flexural strength (kg/mm²) | Thermal conductivity (W/m · K) |
|---|---|---|
| AlN containing Si₃N₄ | | |
| 10 | 60 | 250 |
| 20 | 65 | 220 |
| 50 | 70 | 200 |
| 100 | 69 | 190 |
| AlN containing no Si₃N₄* | | |
| 20 | 35 | 180 |

(Note)
*Comparative Example

As is clear from Table 5, the sintered bodies produced from the inventive composite aluminum nitride powder containing Si₃N₄ particles therein had superior flexural strength and thermal conductivity over the comparative aluminum nitride powder not containing Si₃N₄.

This invention provides composite ceramic powder suitable for producing sintered bodies made of matrix ceramic powder and fine dispersoid particles. The present invention has overcome the problem of non-uniformity in the sintering process, said non-uniformity being responsible to irregular grain grown and the like in the course of sintering, and further the handling difficulties of a precursor in the precursor process. This invention has made it possible to stably provide sintered ceramic bodies of a composite material, said bodies having excellent properties, especially with respect to thermal conductivity, flexural strength and light transmittance, by a conventional ceramic fabrication process.

What is claimed is:

1. A heat-treated composite ceramic powder consisting essentially of matrix ceramic particles and fine crystalline particles of ceramic, metal, or metal compounds which are different from said matrix ceramic particles, and dispersed in each of said matrix ceramic particles, said matrix ceramic particles consisting of at least one crystalline compound selected from the group consisting of nitrides, carbides, and oxides of Si, Al, Zr, Ti, Mg, and B, said fine crystalline particles consisting of at least one substance selected from the group consisting of Ti, Zr, Hf, V, Nb, Ta, Mo, W, Fe, Co, Ni, Cu, Ag, Au, Pt, Pd, B, Mg, Al, and Si, their nitrides, carbides, oxides, and metal compounds, and mixtures thereof, the average particle size of said matrix ceramic particle being not more than 5 μm and that of said fine crystalline particles is not more than 1 μm, there being 0.01% to 50% by weight of said dispersed fine crystalline particles based on said composite ceramic powder, not more than 1.0% by weight of said fine crystalline particles being contained as matrix impurities in the form of a solid solution in said matrix ceramic particles, incidental impurities being contained in said composite ceramic powder and being other than said matrix impurities, said incidental impurities amounting to not more than 2.0% by weight based on said composite ceramic powder.

2. The powder of claim 1 wherein said fine particles have a different crystal structure from the crystal structure of said matrix particles.

3. The powder of claim 1 wherein said matrix particles comprise aluminum nitride particles.

4. The powder of claim 3 wherein the average particle size of said aluminum nitride particles is not greater than 2.0 μm.

5. A heat-treated composite ceramic powder consisting essentially of matrix ceramic particles and fine crystalline particles of ceramic, metal, or metal compounds which are different from said matrix ceramic particles and dispersed in each of said matrix ceramic particles, the average particle size of said fine crystalline particles is not greater than 1 μm, said fine crystalline particles being 0.01% to 50% by weight based on said composite ceramic powder, not more than 1.0% by weight of said fine crystalline particles being contained as matrix impurities in the form of a solid solution in said composite ceramic powder, incidental impurities being contained in said composite ceramic powder and being other than said matrix impurities, said incidental impurities amounting to not more than 2.0% by weight based on said composite ceramic powder, said matrix ceramic particles consisting of crystalline aluminum nitride particles and said dispersed fine particles consisting of at least one substance selected from the group consisting of Ti, Zr, Hf, V, Nb, Ta, Mo, W, Fe, Co, Ni, Cu, Ag, Au, Pt, Pd, B, Mg, Al, and Si, and their nitrides, carbides, oxides, and metal compounds, the average particle size of said crystalline aluminum nitride particles being not more than 2.0 μm.

6. The powder of claim 5 wherein the average particle size of said matrix particles is not greater than 1 μm.

7. The powder of claim 5 wherein said fine crystalline particles have a crystal structure different from the crystal structure of said matrix particles.

8. A heat-treated composite ceramic powder consisting essentially of matrix ceramic particles and fine crystalline particles of ceramic, metal, or metal compounds which are different from said matrix ceramic particles and dispersed in each of said matrix ceramic particles, the average particle size of said matrix ceramic particles is not greater than 5 μm and that of said fine crystalline particles is not greater than 1 μm, said dispersed fine crystalline particles being 0.01% to 50% by weight based on said composite ceramic powder, not more than 1.0% by weight of said fine crystalline particles being contained as matrix impurities in the form of a solid solution in said matrix ceramic particles, and incidental impurities being contained in said matrix ceramic powder and being other than said matrix impurities, said incidental impurities amounting to not more than 2.0% by weight based on said composite ceramic powder.

9. The powder of claim 8 wherein said matrix particles consist of at least one crystalline compound selected from the group consisting of nitrides, carbides, and oxides of Si, Al, Zr, Ti, Mg, B, and mixtures thereof, and said fine crystalline particles consist of at least one substance selected from the group consisting of Ti, Zr, Hf, V, Nb, Ta, Mo, W, Fe, Co, Ni, Cu, Ag, Au, Pt, Pd, B, Mg, Al and Si, and their nitrides, carbides, oxides, and metal compounds, and mixtures thereof.

10. The powder of claim 8 wherein said fine crystalline particles have a crystal structure different from the crystal structure of said matrix particles.

11. The powder of claim 9 wherein said matrix particles ar crystalline aluminum nitride particles.

12. The powder of claim 11 wherein the average particle size of said aluminum nitride particles is not greater than 2.0 μm.

13. A composite ceramic powder, adapted for heat treatment to form a composite structure, said powder consisting essentially of matrix ceramic particles and fine crystalline particles of ceramic, metal, or metal compounds, said fine particles forming a surface layer on said matrix particles, whereby said fine crystalline particles disperse in each of said matrix particles on said heat treatment.

14. The powder of claim 13 wherein said fine crystalline particles have a crystal structure different from the crystal structure of said matrix particles.

15. The powder of claim 13 wherein said fine crystalline particles consist of at least one substance selected from the group consisting of Ti, Zr, Hf, V, Nb, Ta, Mo, W, Fe, Co, Ni, Cu, Ag, Au, Pt, Pd, B, Mg, Al and Si, and their nitrides, carbides, oxides, and metal compounds, and mixtures thereof.

16. The powder of claim 13 wherein said matrix particles consist of at least one crystalline compound selected from the group consisting of nitrides, carbides, and oxides, of Si, Al, Zr, Ti, Mg, B, and mixtures thereof.

17. The powder of claim 13 wherein the average particle size of said matrix particles is not greater than 5 μm and that of said fine crystalline particles is not greater than 1 μm.

18. The powder of claim 13 wherein there is 0.01% to 50% by weight of said fine crystalline particles based on said powder.

19. The powder of claim 13 containing not more than 1.0% by weight of said fine crystalline particles as matrix impurities in the form of a solid solution in said matrix particles, and incidental impurities, being other than said matrix impurities, in an amount of not more than 2.0% by weight based on said composite ceramic powder.

20. The powder of claim 15 wherein said matrix particles consist of at least one crystalline compound selected from the group consisting of nitrides, carbides, and oxides of Si, Al, Zr, Ti, Mg, B, and mixtures thereof.

21. The powder of claim 15 wherein said matrix particles comprise crystalline aluminum nitride particles.

22. The powder of claim 21 wherein the average particle size of said crystalline aluminum nitride particles is not greater than 2.0 μm.

* * * * *